(12) United States Patent
Xu et al.

(10) Patent No.: US 11,692,084 B2
(45) Date of Patent: Jul. 4, 2023

(54) PROTECTIVE RUBBER TRACK SHOES FOR EXCAVATOR

(71) Applicant: XUZHOU COLLEGE OF INDUSTRIAL TECHNOLOGY, Jiangsu (CN)

(72) Inventors: Yunhui Xu, Jiangsu (CN); Yating Xu, Jiangsu (CN); Peipei Li, Jiangsu (CN); Zaixue Wang, Jiangsu (CN); Yanan Zang, Jiangsu (CN); Zhongguang Wang, Jiangsu (CN); Guiying Zhao, Jiangsu (CN); Houluo Cong, Jiangsu (CN); Shuaishuai Song, Jiangsu (CN)

(73) Assignee: XUZHOU COLLEGE OF INDUSTRIAL TECHNOLOGY, Xuzhou (CN)

( * ) Notice: Subject to any disclaimer, the term of this patent is extended or adjusted under 35 U.S.C. 154(b) by 16 days.

(21) Appl. No.: 17/527,391

(22) Filed: Nov. 16, 2021

(65) Prior Publication Data
US 2022/0073712 A1  Mar. 10, 2022

(30) Foreign Application Priority Data
Aug. 24, 2021 (CN) .......................... 202110973471.0

(51) Int. Cl.
*C08L 17/00* (2006.01)
*B62D 55/26* (2006.01)

(52) U.S. Cl.
CPC .............. *C08L 17/00* (2013.01); *B62D 55/26* (2013.01); *C08L 2205/025* (2013.01); *C08L 2205/035* (2013.01); *C08L 2207/24* (2013.01)

(58) Field of Classification Search
CPC .............. C08L 17/00; C08L 2205/025; C08L 2207/24; C08L 2205/035; B62D 55/26
See application file for complete search history.

(56) References Cited

FOREIGN PATENT DOCUMENTS

EP           3095802 A1 * 11/2016 ............ C08F 297/04

* cited by examiner

*Primary Examiner* — Robert D Harlan

(57) ABSTRACT

Provided herein is a protective rubber track shoe for an excavator, which includes a first-stage rubber mix and a second-stage rubber mix. The first-stage rubber mix consists of a natural rubber, a chloroprene rubber, a butadiene rubber, a styrene-butadiene rubber, a tire reclaim rubber, a 120-mesh rubber powder, zinc oxide, stearic acid, an anti-aging agent 3100, an anti-aging agent CTU, paraffin wax, an intermediate super abrasion furnace carbon black and an aromatic oil. The second-stage rubber mix consists of the first-stage rubber mix, sulfur, an accelerator CZ and an auxiliary agent.

1 Claim, No Drawings

PROTECTIVE RUBBER TRACK SHOES FOR EXCAVATOR

CROSS-REFERENCE TO RELATED APPLICATIONS

This application claims the benefit of priority from Chinese Patent Application No. 202110973471.0, filed on Aug. 24, 2021. The content of the aforementioned application, including any intervening amendments thereto, is incorporated herein by reference in its entirety.

TECHNICAL FIELD

This application relates to rubber auxiliary products of tracks, and more particularly to a protective rubber track shoe for an excavator.

BACKGROUND

Tracks, commonly used on construction vehicles and military vehicles, generally include track plates and track pins. In addition, in order to reduce the damage to road surface and weaken the mechanical vibration and noise, the track plates are further equipped with rubber track shoes. Due to the long-term field operation, the protective rubber track shoes for excavators are prone to aging and cracking under the exposure to sunlight, ozone, wind and rain. Furthermore, the thermo-oxidative aging, ozone aging, flex cracking of the rubber layer during driving will largely affect the service life of the rubber track shoes.

SUMMARY

In order to overcome the shortcomings of the prior art, the present disclosure provides a protective rubber track shoe with good tear resistance, thermo-oxidative aging property, ozone aging resistance, dynamic flex cracking resistance and low heat generation in compression. In addition, the protective rubber track shoe has reduced cost and optimized preparation process.

The technical solutions of the present disclosure are described as follows.

A protective rubber track shoe for an excavator, comprising:
  a first-stage rubber mix; and
  a second-stage rubber mix;
  wherein the first-stage rubber mix consists of 22-25 parts by weight of a natural rubber, 4-5 parts by weight of a chloroprene rubber, 40-42 parts by weight of a butadiene rubber, 30-32 parts by weight of a styrene-butadiene rubber, 60 parts by weight of a tire reclaim rubber, 8 parts by weight of a 120-mesh rubber powder, 4.0-6.0 parts by weight of zinc oxide, 2.0-3.0 parts by weight of stearic acid, 0.9-1.1 parts by weight of an anti-aging agent 3100, 1.0-1.2 parts by weight of an anti-aging agent CTU, 0.8 part by weight of paraffin wax, 55-59 parts by weight of an intermediate super abrasion furnace carbon black and 5.8-6.2 parts by weight of an aromatic oil; and
  the second-stage rubber mix consists of 233.5-249.3 parts by weight of the first-stage rubber mix, 1.0-1.2 parts by weight of sulfur, 1.3-1.5 parts by weight of an accelerator CZ and 3.8-4.2 parts by weight of an auxiliary agent.

In some embodiments, the natural rubber is a natural rubber SCRS.

In some embodiments, the chloroprene rubber is a W-type chloroprene rubber.

The beneficial effects of the present disclosure are described as follows.

The property of the rubber track shoe provided herein is largely improved, and can meet various performance requirements for rubber track shoes. The protective rubber track shoe provided herein has a brilliant application prospect, and is suitable for the industrial promotion.

DETAILED DESCRIPTION OF EXAMPLES

The present disclosure will be further described below with reference to the embodiments.

Example 1

Provided herein was a protective rubber track shoe for an excavator, including a first-stage rubber mix and a second rubber mix.

The first-stage rubber mix consisted of 24 parts by weight of a natural rubber SCRS, 4 parts by weight of a W-type chloroprene rubber, 41 parts by weight of a butadiene rubber, 31 parts by weight of a styrene-butadiene rubber, 60 parts by weight of a tire reclaim rubber, 8 parts by weight of a 120-mesh rubber powder, 5 parts by weight of zinc oxide, 2.5 parts by weight of stearic acid, 1.0 part by weight of an anti-aging agent 3100, 1.1 parts by weight of an anti-aging agent CTU, 0.8 part by weight of paraffin wax, 57 parts by weight of an intermediate super abrasion furnace carbon black and 6 parts by weight of an aromatic oil.

The second-stage rubber mix consisted of 241.4 parts by weight of the first-stage rubber mix, 1.1 parts by weight of sulfur, 1.4 parts by weight of an accelerator CZ and 4.0 parts by weight of an auxiliary agent.

Example 2

Provided herein was a comparative sample, in which the chloroprene rubber was absent.

The comparative sample included a first-stage rubber mix and a second rubber mix. The first-stage rubber mix consisted of 28 parts by weight of a natural rubber SCRS, 41 parts by weight of a butadiene rubber, 31 parts by weight of a styrene-butadiene rubber, 60 parts by weight of a tire reclaim rubber, 8 parts by weight of a 120-mesh rubber powder, 5 parts by weight of zinc oxide, 2.5 parts by weight of stearic acid, 1.0 part by weight of a new anti-aging agent 3100, 1.1 parts by weight of a no pollution anti-aging agent CTU, 0.8 parts by weight of paraffin wax, 57 parts by weight of an intermediate super abrasion furnace carbon black and 6 parts by weight of an aromatic oil.

The second-stage rubber mix consisted of 241.4 parts by weight of the first-stage rubber mix, 1.1 parts by weight of sulfur, 1.4 parts by weight of an accelerator CZ and 4.0 parts by weight of an auxiliary agent.

Example 3

Provided herein was a comparative sample, in which the rubber powder was absent.

The first-stage rubber mix consisted of 24 parts by weight of a natural rubber SCRS, 4 parts by weight of a W-type chloroprene rubber, 41 parts by weight of a butadiene rubber, 31 parts by weight of a styrene-butadiene rubber, 60 parts by weight of a tire reclaim rubber, 5 parts by weight of zinc oxide, 2.5 parts by weight of stearic acid, 1.0 part by weight of a new anti-aging agent 3100, 1.1 parts by weight of a no pollution anti-aging agent CTU, 0.8 parts by weight of paraffin wax, 57 parts by weight of an intermediate super abrasion furnace carbon black and 6 parts by weight of an aromatic oil.

The second-stage rubber mix consisted of 233.4 parts by weight of the first-stage rubber mix, 1.1 parts by weight of sulfur, 1.4 parts by weight of an accelerator CZ and 4.0 parts by weight of an auxiliary agent.

Example 4

Provided herein was a comparative sample, in which a combination of a common anti-aging agent 4010NA and an anti-aging agent D was used.

The first-stage rubber mix consisted of 24 parts by weight of a natural rubber SCRS, 4 parts by weight of a W-type chloroprene rubber, 41 parts by weight of a butadiene rubber, 31 parts by weight of a styrene-butadiene rubber, 60 parts by weight of a tire reclaim rubber, 8 parts by weight of a 120-mesh rubber powder, 5 parts by weight of zinc oxide, 2.5 parts by weight of stearic acid, 1.0 part by weight of a common anti-aging agent 4010NA, 1.1 parts by weight of a anti-aging agent D, 0.8 parts by weight of paraffin wax, 57 parts by weight of an intermediate super abrasion furnace carbon black and 6 parts by weight of an aromatic oil.

The second-stage rubber mix consisted of 241.4 parts by weight of the first-stage rubber mix, 1.1 parts by weight of sulfur, 1.4 parts by weight of an accelerator CZ and 4.0 parts by weight of an auxiliary agent.

Example 5

The formula used herein was a comparative formula, in which a common anti-aging agent 4010NA and an anti-aging agent 4020 were added.

The first-stage rubber mix consisted of 24 parts by weight of a natural rubber SCRS, 4 parts by weight of a W-type chloroprene rubber, 41 parts by weight of a butadiene rubber, 31 parts by weight of a styrene-butadiene rubber, 60 parts by weight of a tire reclaim rubber, 8 parts by weight of a 120-mesh rubber powder, 5 parts by weight of zinc oxide, 2.5 parts by weight of stearic acid, 1.0 part by weight of a common anti-aging agent 4010NA, 1.1 parts by weight of an anti-aging agent 4020, 0.8 parts by weight of paraffin wax, 57 parts by weight of an intermediate super abrasion furnace carbon black and 6 parts by weight of an aromatic oil.

The second-stage rubber mix consisted of 241.4 parts by weight of the first-stage rubber mix, 1.1 parts by weight of sulfur, 1.4 parts by weight of an accelerator CZ and 4.0 parts by weight of an auxiliary agent.

Performance Test

1. Physical and Mechanical Properties

TABLE 1

Comparison of physical and mechanical properties of the protective rubber track shoes prepared in Examples 1-5

| Properties | Items | Example 1 | Example 2 | Example 3 | Example 4 | Example 5 |
|---|---|---|---|---|---|---|
| Mechanical property | Tensile strength (MPa) | 18.52 | 16.73 | 18.71 | 17.86 | 18.68 |
| | Stress at an elongation 100% (MPa) | 3.62 | 2.56 | 3.89 | 3.21 | 3.42 |
| | Stress at an elongation 300% (MPa) | 10.91 | 8.26 | 10.27 | 9.89 | 9.56 |
| | Elongation (%) | 645 | 557 | 568 | 648 | 640 |
| | Shore A hardness | 60 | 61 | 59 | 62 | 62 |
| Tear resistance | Tear strength (N/mm) | 78.11 | 67.42 | 76.21 | 78.01 | 76.45 |
| Wear resistance property | Akron abrasion (cm$^3$) | 0.13 | 0.13 | 0.20 | 0.14 | 0.13 |
| Heat generation in compression | Final temperature (° C.) | 59.4 | 59.7 | 73.9 | 61.2 | 60.4 |

The following conclusions can be obtained based on Table 1.

(1) A combination of a small amount of the W-type chloroprene rubber, the natural rubber, styrene-butadiene rubber and butadiene rubber would improve the tear resistance of the protective rubber track shoe for the excavator, and the tear resistance was improved by about 15%.

(2) A combination of a small amount of the W-type chloroprene rubber, the natural rubber, styrene-butadiene rubber and butadiene rubber would improve the wear resistance of the protective rubber track shoe for the excavator, and the wear resistance was improved by about 35%.

(3) The introduction of a small amount of the 120-mesh rubber powder would improve the processing performance of the rubber compound, and reduce the heat generation of the track shoe in compression. The final temperature of the rubber mix in the compression was reduced about 20%, and the wear resistance of the rubber mix was enhanced by about 35%.

2. Thermo-Oxidative Aging Resistance

TABLE 2

Comparison of thermo-oxidative aging resistance of the protective rubber
track shoes prepared in Examples 1-5

| Experimental conditions | Items | | Example 1 | Example 2 | Example 3 | Example 4 | Example 5 |
|---|---|---|---|---|---|---|---|
| 100° C. × 72 h Thermo-oxidative aging test | Tensile strength (MPa) | Before aging | 18.52 | 16.73 | 18.71 | 17.86 | 18.68 |
| | | After aging | 17.36 | 15.89 | 17.23 | 15.24 | 16.14 |
| | | Aging coefficient (%) | −6 | −5 | −8 | −15 | 14 |
| | Hardness | Before aging | 60 | 61 | 59 | 62 | 62 |
| | | After aging | 68 | 67 | 66 | 73 | 72 |
| | | Variation | +8 | +6 | +7 | +11 | +10 |
| Outdoor exposure | 3 Months | | No discoloration | No discoloration | No discoloration | Serious discoloration | Serious discoloration |
| | 6 Months | | Light discoloration | Light discoloration | Light discoloration | Serious discoloration | Serious discoloration |
| | 12 Months | | Light discoloration | Light discoloration | Light discoloration | Serious discoloration | Serious discoloration |

The following conclusions can be drawn based on Table 2.

(1) Using the new anti-aging agent 3100 in accompany with the pollution-free anti-aging agent CTU to replace the combination of the anti-aging agent 4010NA and the anti-aging agent D or the combination of the anti-aging agent 4010NA and the anti-aging agent 4020 would largely improve the thermo-oxidative aging resistance of the protective rubber track shoes. Specifically, in the thermo-oxidative aging tests under the same conditions, an absolute value of the aging coefficient was reduced by 40-50%.

(2) Using the new anti-aging agent 3100 in accompany with the pollution-free anti-aging agent CTU to replace the combination of the anti-aging agent 4010NA and the anti-aging agent D or the combination of the anti-aging agent 4010NA and the anti-aging agent 4020 would hinder the discoloration of the protective rubber track shoes due to the fact that the new anti-aging agent 3100 has low volatility, extractability and mobility, and the pollution-free anti-aging agent CTU is non-polluting and low in coloring performance, and has low mobility.

3. Ozone Aging Resistance

TABLE 3

Comparison of ozone aging resistance of the protective rubber track shoes prepared in Examples 1-5

| | Aging results | | |
|---|---|---|---|
| Examples | The earliest time for an appearance of crack (h) | Aging time (h) | Crack conditions |
| Example 1 | 48 | 72 | crack on one side, within 1 mm |
| Example 2 | 52 | | crack on one side, within 1 mm |
| Example 3 | 40 | | crack on both sides, more than 1-3 mm |
| Example 4 | 20 | | a large number of cracks on both sides, no less than 3-5 mm |
| Example 5 | 16 | | a large number of cracks on both sides, no less than 3-5 mm |

Note
1. Experimental conditions of ozone aging
Ozone concentration: 200 ± 5 ppm; sample elongation: 20%; test temperature: 40 ± 2° C.; relative humidity: 60%; and ozone flow rate: 500 mL/min.
2. During the experiment, samples were observed every four hours to determine "the earliest crack" in the ozone aging.

Table 3 showed the followings.

Using the new anti-aging agent 3100 in accompany with the pollution-free anti-aging agent CTU to replace the combination of the anti-aging agent 4010NA and the anti-aging agent D or the combination of the anti-aging agent 4010NA and the anti-aging agent 4020 would improve the ozone aging resistance of protective rubber track shoes, and the time of resistance against ozone aging was extended by 2-3 times.

4. Flex Cracking Resistance

TABLE 4

Comparison of flex cracking resistance of the protective rubber track shoes prepared in Examples 1-5

| | Phenomenon and degree of cracking | | | | |
|---|---|---|---|---|---|
| The number of flex | Example 1 | Example 2 | Example 3 | Example 4 | Example 5 |
| 50 thousand | No crack | No crack | No crack | No crack | No crack |
| 55 thousand | No crack | No crack | No crack | No crack | No crack |
| 60 thousand | No crack | No crack | No crack | No crack | No crack |
| 65 thousand | No crack | No crack | No crack | No crack | No crack |
| 70 thousand | No crack | No crack | No crack | No crack | No crack |
| 75 thousand | No crack | 6 pinprick-like cracks, level 1 | No crack | No crack | No crack |
| 80 thousand | No crack | 3 cracks within 0.5-1.0 mm, level 3 | No crack | No crack | No crack |
| 85 thousand | No crack | 5 cracks within 1.0-1.5 mm, level 4 | No crack | No crack | No crack |
| 90 thousand | No crack | The largest crack is greater than 3 mm. level 6 | No crack | No crack | No crack |
| 95 thousand 100 thousand | No crack 2 pinprick-like cracks, level 1 | — — | No crack 9 pinprick-like cracks, level 1 | No crack 8 pinprick-like cracks, level 1 | No crack 5 pinprick-like cracks, level 1 |

A combination of a small amount of the W-type chloroprene rubber, the natural rubber, styrene-butadiene rubber and butadiene rubber, with the new anti-aging agent 3100 in accompany with the pollution-free anti-aging agent CTU as a protection system, would improve the flex cracking resistance of the protective rubber track shoes. The number of the flexes that the protective rubber track shoe can resist was increased by 30-35,000, and the flex cracking resistance was increased by about 40%.

5. Others (1) The new anti-aging agent 3100 and the pollution-free anti-aging agent CTU, used as a protection system, reduced the rubber frost spray of protective rubber track shoe for the excavator.

(2) A combination of a small amount of the W-type chloroprene rubber, the natural rubber, styrene-butadiene rubber and butadiene rubber would improve the flame retardancy of protective rubber crack shoe for the excavator.

(3) When adhering to a creak plates, the protective rubber crack shoe prepared using a combination of a small amount of the W-type chloroprene rubber, the natural rubber styrene-butadiene rubber and butadiene rubber would increase the viscosity of a coating.

(4) The rubber powder and reclaimed rubber used herein largely reduced the cost and improved the processing of the rubber compound for the protective rubber track shoe.

What is claimed is:

1. A protective rubber track shoe for an excavator, comprising:
    a first-stage rubber mix; and
    a second-stage rubber mix;
    wherein the first-stage rubber mix consists of 22-25 parts by weight of a natural rubber, 4-5 parts by weight of a chloroprene rubber, 40-42 parts by weight of a butadiene rubber, 30-32 parts by weight of a styrene-butadiene rubber, 60 parts by weight of a tire reclaim rubber, 8 parts by weight of a 120-mesh rubber powder, 4.0-6.0 parts by weight of zinc oxide, 2.0-3.0 parts by weight of stearic acid, 1.9-2.3 parts by weight of an anti-aging agent 0.8 part by weight of paraffin wax, 55-59 parts by weight of an intermediate super abrasion furnace carbon black and 5.8-6.2 parts by weight of an aromatic oil; and
    the second-stage rubber mix consists of 233.5-249.3 parts by weight of the first-stage rubber mix, 1.0-1.2 parts by weight of sulfur, 1.3-1.5 parts by weight of an accelerator and 3.8-4.2 parts by weight of an auxiliary agent.

* * * * *